United States Patent [19]

Moltrecht

[11] 4,058,920

[45] Nov. 22, 1977

[54] TELEPHONE NUMBER REGISTER

[76] Inventor: Reinhold Moltrecht, Klosterbergenstrasse 20a, 2057 Reinbek, Germany

[21] Appl. No.: 694,941

[22] Filed: June 11, 1976

[30] Foreign Application Priority Data

| | | |
|---|---|---|
| July 5, 1975 | Germany | 2530106 |
| Sept. 20, 1975 | Germany | 2542046 |

[51] Int. Cl.[2] .......... H04M 1/04; A47B 88/00

[52] U.S. Cl. .......... 40/336; 312/319; 312/330 R; 312/333

[58] Field of Search .......... 312/330 R, 319, 333; 40/336

[56] References Cited

U.S. PATENT DOCUMENTS

| | | | |
|---|---|---|---|
| 2,957,260 | 10/1960 | Zandelin | 40/336 |
| 2,968,110 | 1/1961 | Quarnstrom | 40/336 |
| 3,167,371 | 1/1965 | Parcher et al. | 312/319 |
| 3,721,485 | 3/1973 | Beger | 312/330 |
| 3,730,604 | 5/1973 | Viera | 312/319 |

*Primary Examiner*—Paul R. Gilliam
*Assistant Examiner*—Alex Grosz
*Attorney, Agent, or Firm*—Arnold, White & Durkee

[57] ABSTRACT

An improvement in a telephone number register having a plurality of double levers in a drawer for positioning selected register cards, each of said levers including locking means for holding a lever in its selected position and automatically releasing the locking means upon the return of the drawer to the register casing. The locking means preferably includes a pivotable flap for each lever for holding down a depressed front end part of an associated lever and the release is preferably provided by an abutment connected to the casing for pivoting the flap from its locking position.

11 Claims, 8 Drawing Figures

TELEPHONE NUMBER REGISTER

Figure 1:
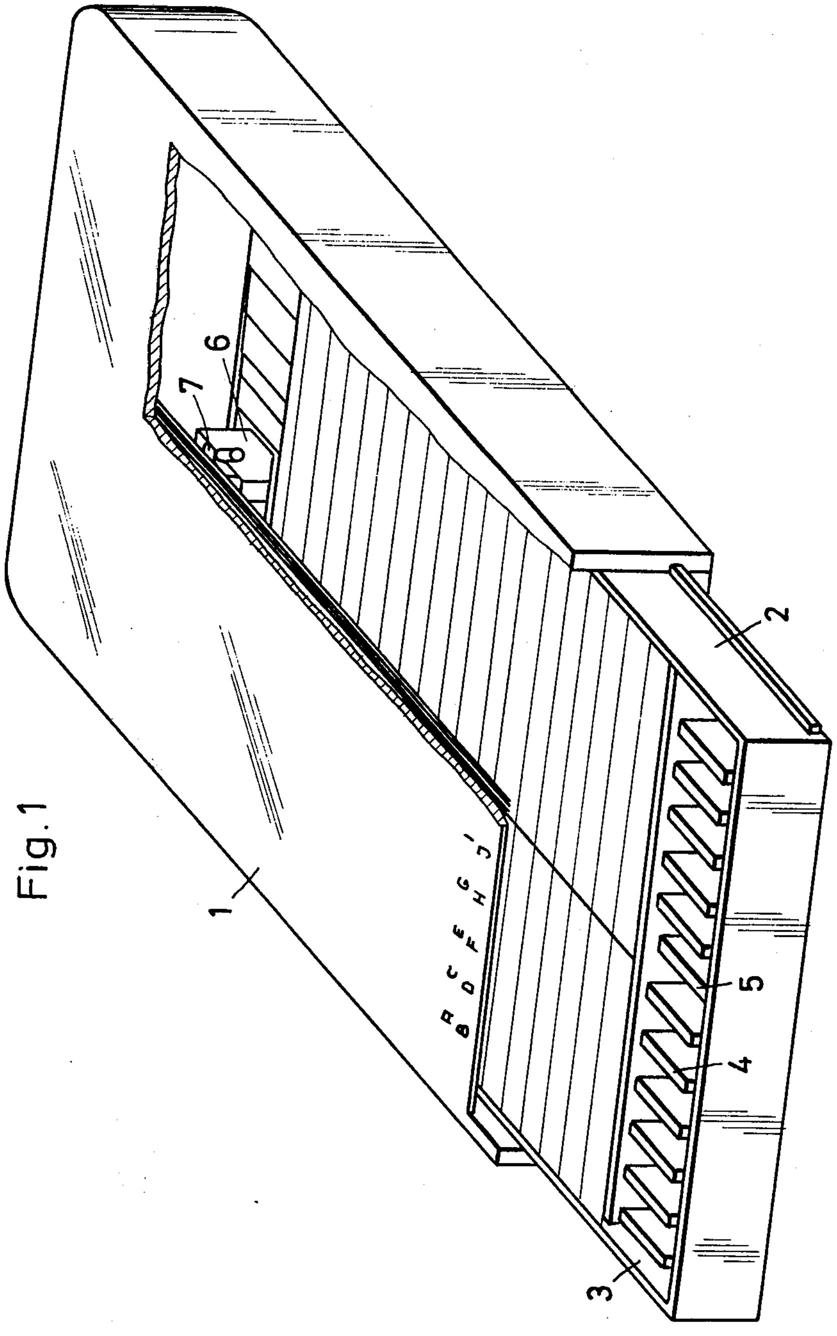

The invention relates to a telephone number register with a shallow casing, a drawer guided therein, supporting the register cards and adapted to move out of the front side and a plurality of double levers supported on the drawer and in turn supporting on their rear end projection selectors which co-operate with the register cards when said selectors are in the raised selector position obtained by a lowering of the front lever ends.

In a known telephone number register of this kind (German Pat. Spec. No. 1,245,905), the lever must be held by hand in the selector position during the withdrawal action so that the cards which are moved outwardly with the drawer are separated from those which remain in the casing. Operation of the register would be simpler if the lever did not have to be held during the withdrawal motion. Moreover, the need for retaining the lever in the selector position is an obstacle to the attempt to modify the construction of the register so that the drawer is automatically accelerated out of the casing by spring force after the selected lever is depressed.

It is the object of the invention to modify the initally mentioned telephone number register so that the selected lever need not be constantly held by hand in the selection position while the drawer is withdrawn.

According to the invention, the problem is solved in that each lever is associated with locking means which retains it in the selector position and can be released by inserting the drawer into the casing. As soon as a lever is depressed for selecting a card and is thus moved into the selection position, the locking means engage and retain the said lever in the selection position. It is therefore no longer necessary to hold the lever by hand while the drawer is pulled out. On the one hand this facilitates manual operation of the register and on the other hand permits automatic operation. The locking means are released as soon as the drawer is pushed back into the casing and the apparatus is thus freed for a fresh card selection.

Any ratchet device which is able on the one hand to retain the lever in the selection position and on the other hand can be released by the motion of the drawer can be employed for the purpose of the invention. However, special preference is given to locking means comprising a flap which can be pivoted about a horizontal axis extending transversely to the lever direction from above the front end of the lever, said flap dropping into the bottom dead-centre position when the front lever end is lowered, thus preventing any upward motion of the front end of the lever. The flap can be deliberately released either manually or automatically by the relative motion between the drawer and the casing. A particularly advantageous embodiment is arranged so that a two-armed lever, pivotable about a transversely extending axis, is supported in the drawer and co-operates by means of its top end with the flap so that in the course of a rearwardly directed pivoting motion it pivots the flap from the bottom dead-centre position and the casing bottom is provided with a threshold which co-operates with the bottom, heavy lever end and causes said lever to perform such pivoting motion when the drawer is inserted against gravitation force or spring force. When the drawer is inserted the bottom lever end is retained by the threshold so that the top lever end moves in the slide-in direction to the flap and pushes it out of the bottom dead-centre position. The lever remains inoperative when the drawer is pulled out because said lever is pivoted in the opposite sense, i.e. away from the flap at the top.

Another embodiment of the invention is arranged so that a stop abutment, which comes into action when the drawer is inserted to release the flap from the bottom dead-centre position, is provided in the casing for each clap. When the drawer is inserted the flap moves against the stop abutment which retains it and thus transfers it from the bottom dead-centre position into a pivoted position in which it releases the lever.

To enable the flap to drop into the locking position even during the initial depressing of a lever and to enable such flap to remain in that position while the drawer is pulled out, a further suitable embodiment of the invention provides that the stop abutment is resiliently constructed so as to be deflected by a flap in its bottom dead-centre position when the drawer is moved outwardly. For example, the stop abutment can be formed by a tilting lever or a resilient reed which is fixed with respect to the casing and projects from the bottom rear to the top front.

Although the stop abutment is able to avoid the flap when the drawer is moved outwardly, said abutment nevertheless applies a specific frictional force under which the flap must retain its dead-centre position. This can be ensured by arranging that a stop abutment is provided on the drawer behind the flap at or slightly behind its bottom dead-centre position on which the flap can bear when it moves over the stop abutment.

The means described about result in automatic unlocking of the selected lever if the drawer is pushed back into the casing. Instead, it is also possible to arrange for the flaps to be manually unlocked. To this end, the drawer can be provided with a tappet one of whose ends projects as handle from the drawer while the other end co-operates with the flap so as to unlock it when the handle is operated. The tappets of all flaps can be joined to each other in the manner of a comb. The handle in this case is a knob, associated with the comb and projecting from the drawer at the front. The front closing strip of the drawer can also be constructed in movable form and can be arranged as handle for the tappets. If the drawer is pushed back into the casing by gripping this strip or the knob a force will be applied to it which results in a motion of the tappet which releases the flap without the need for any separate manipulation other than pushing in the drawer.

The number of flaps corresponds to the number of levers. According to the invention, all flaps are supported on a common rod which can be relatively thin and is retained by its ends in the drawer while a strip or other casing part is disposed above the flaps for the latter to bear thereon. If the outward motion of the drawer is to be obtained automatically by spring force it is appropriate to provide the underside of the drawer with a cam behind with engages a pawl, provided in the casing, when the drawer is in the inserted position, said cam being associated with a bar which extends over the entire width of the lever group beneath the front lever ends in such a way that the pawl is released when a front lever end is lowered. The arrangement of the pawl and cam can also be reversed.

Figure 4:
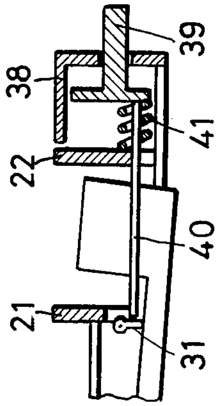
Figure 2:
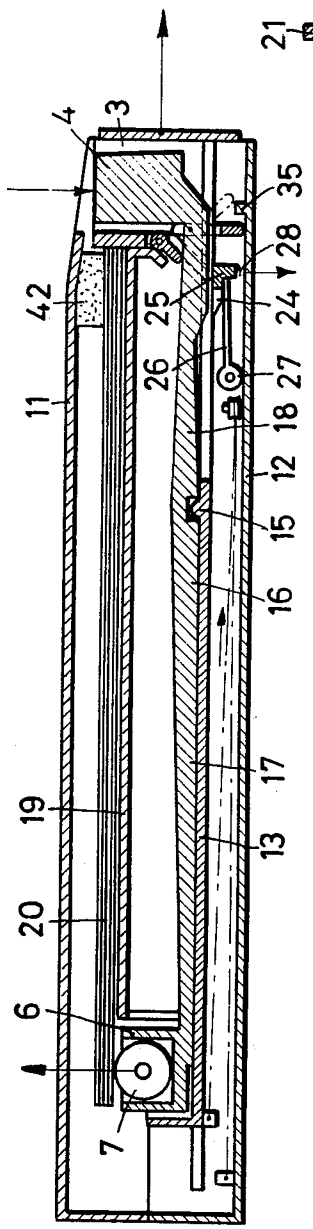
Figure 3:
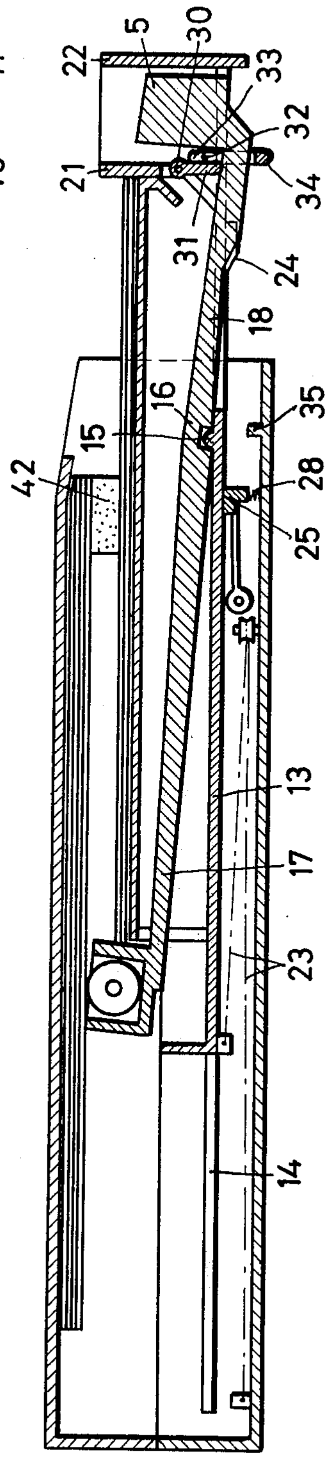

Two advantageous embodiments of the invention will be described hereinbelow by reference to the accompanying drawing, in which:

FIG. 1 is a partially sectioned general view of the register,

FIG. 2 is a vertical longitudinal section through the register with the drawer pushed in, FIG. 3 is a section corresponding to FIG. 2 with the drawer partially pulled out, FIG. 4 is a partial section through the front part of a drawer with manually operated tappets for releasing the flaps and FIGS. 5 to 8 are partial sections through the front part of another embodiment of the register in different operational positions.

FIG. 1 illustrates the kind of telephone number register according to the invention. It comprises a casing 1 in which the drawer 2 is guided so that it can be pulled out from the front of the casing. A series of push-buttons 4, which are situated at the front ends of the double levers, are located in a recess 3 which is associated with the drawer and is open at the top. One button 5 is shown in its depressed state. A projecting selector 6 with roller 7 is situated at the rear end of the associated lever—in the same way as on all other levers—extends outwardly through the selector recess at the rear edge of the selector card and through the card stack situated below and thrusts the unselected card stack against the casing top. Reference should be made to the German Pat. Spec. No. 1,245,905 regarding further details and their operation.

According to FIGS. 2 and 3 the casing comprises a casing top 11 and a casing bottom 12. The drawer comprises a plate 13 the two edges of which are guided in grooves 14 of the casing sides and on which bear the double levers 16 which are pivotably supported at 15 and are urged into the inoperative state illustrated in FIG. 2 due to the greater weight of their rear lever ends 17. The plate 12 is cut out beneath the front lever ends 18 to enable them to pass through downwardly in accordance with FIG. 3.

Above the levers 16 a support surface 19 is situated above and is connected to the plate 13 which supports the card stack 20. The projecting selectors 6 of the rear ends of the levers extend above the support surface 19 so that they can co-operate with the selector cut-out of the cards.

The section 3 of the drawer in which the push-buttons 4 of the levers is situated is formed by a frame with the strips 21 and 22. A spring system, tending to pull the drawer out of the casing, is provided beneath the drawer. This system is indicated in dash-dot lines at 23. A cam 24 is arranged on the underside of the drawer and in the inserted position thereof according to FIG. 2 co-operates with a ratchet formed by a bar 25 which extends over the entire width of the drawer and in the latched state is situated near the front end of the levers 16 in the inoperative state thereof. The cam is fixed to two bearing arms 26 each of which is arranged on one casing side and is pivotably supported on the said casing at 27. The bar is raised by spring force 28. The cam is chamfered on its rear. When the drawer is inserted the bar therefore snaps behind the cam as soon as the drawer has reached the intended inserted position. If any one of the push-buttons 4, for example the push-button 5 according to FIG. 3, is lowered the associated front lever arm 18 will press upon the bar 25 and thus release the locking means. The drawer is then pushed out the casing by the spring force 23.

A small flap is located on a transversely extending spindle 30 above each lever end 18 on the strip 21 of the drawer and in its inoperative state is retained by its lever end 18 in the slightly raised position shown in FIG. 2. However, it is so easily movable that when the lever end 18 is lowered it drops under its own dead weight into its bottom dead-centre position with respect to the lever so that the latter is locked in the lowered position according to FIG. 3. The lower dead-centre position is this context refers to each relative position of the flap and the lever surface co-operating therewith in which said position the flap is retained in the locking position due to friction against the surface of the lever.

If a card is selected by depressing a button 5 and the operating mechanism of the drawer is thus triggered, the selected lever will simultaneously be locked in the lowered position so that its selected position is retained for the time being. However, this position must be released after the drawer is again inserted into the casing so that another card can be selected. To this end, a lever 32 is supported slightly in front and beneath each flap 31 in the embodiment according to FIGS. 2 and 3, said lever having a top lever end 33 and a heavier and/or longer bottom lever end 34. As indicated in the drawing by cross-hatching, the bottom lever ends can be joined to each other in the manner of a comb. The lever 32 is supported so as to be so easily movable as to tend to assume the vertical position under its own dead weight, as indicated in both the FIGS. A threshold 35 which is higher than the lowest point of the vertically suspended lever is arranged on the bottom of the casing. The lever is therefore pivoted when it is moved together with the drawer over the threshold. As indicated in dash-dot lines in FIG. 2, the top lever end is moved to the rear when the drawer is inserted so that the flap is moved from its locked position (FIG. 3) into the release position (FIG. 2). The motion of the lever in the opposite sense when the drawer moves outwardly has no effect on the flap.

Figure 5:
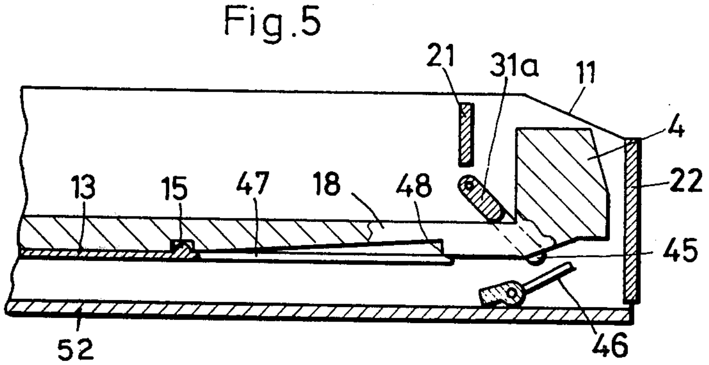

Another embodiment is illustrated in FIGS. 5 to 8. FIG. 5 shows the arrangement in the inoperative state when the drawer is inserted in the casing. The front lever end 4 is raised. The associated flap **31*a*** is correspondingly set at an angle.

Figure 6:
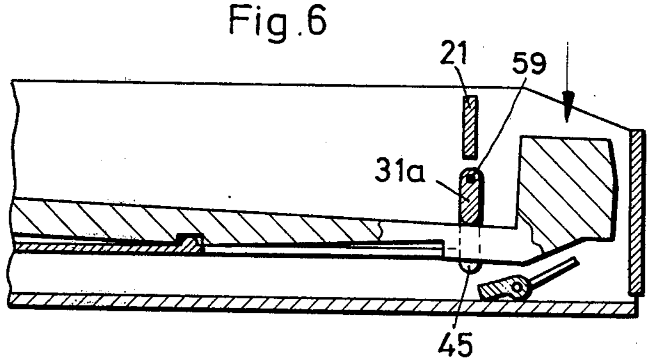
Figure 7:
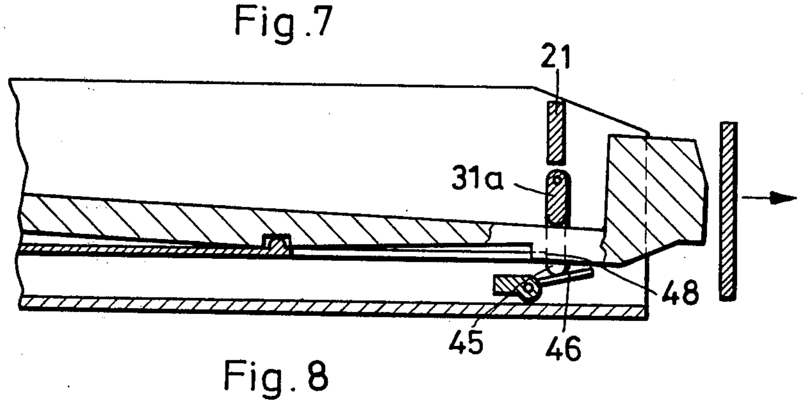
Figure 8:
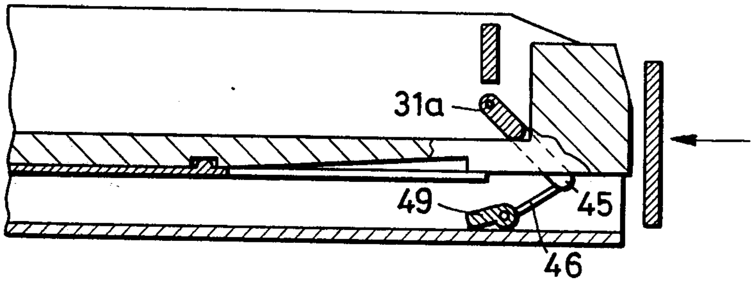

If thrust is applied in the arrow direction on the front lever end 4 in accordance with FIG. 6, the lever end is lowered, the flap **31*a* dropping under its own dead weight into the vertical position in which the front lever end is prevented from returning into the raised position. Simultaneously, the locking means of the drawer in the casing are released in the manner described above so that the drawer begins to move forwardly out of the casing in accordance with FIG. 7**.

A shoulder 45 which projects downwardly adjacent to the lever 18, i.e. between said lever and the next adjacent lever, is mounted on the flap **31*a*. A resilient reed 46, formed by a lever arm of a rocker lever, is arranged at a corresponding position on the casing bottom 52 and is urged upwardly by the larger dead weight of the other lever arm 49 but is able to yield downwardly. Alternatively, the resilient reed may be formed by a leaf spring which consists of spring elastic material and can be arranged in the same way as the lever arm 46** and can be produced, for example, integrally with the corresponding casing part or can be joined thereto by adheshive fixing.

The reed 46 is arranged so that the shoulder 45 is able to swing downwardly without obstruction together with the flap **31*a* when the drawer is in the inoperative state (FIGS. 5 and 6**), but the reed engages with the flap 31*a* when the drawer is moved. On the outward motion of the drawer in accordance with FIG. 7 the shoulder 45 slides over the reed 46, the latter yielding downwardly. The shoulder 45 will then bear upon a stop abutment 48 which is formed by a projection 47 of the bottom drawer plate 13 and extends between the levers. At the front end of said plate is therefore constructed in the manner of a comb to form an abutment 48 for each flap.

When the shoulder 45 slides over the resilient reed 46 the flap 31*a* bears against the stop abutment 48. This can also be arranged so that the flap 31*a* is set at a slight angle to the rear. This inclined position is not detrimental or can be even advantageous because it is even more stable than the accurately vertical position. In the sense of the invention it is inclined in the concept of the bottom dead-centre position.

When the drawer is inserted in accordance with FIG. 8 the shoulder 45 again co-operates with the reed 46 but the latter cannot yield because its front end abuts against the shoulder 45. Accordingly, the flap 31*a* is pivoted in the forward direction until it resumes the inoperative position shown in FIG. 1 while releasing the lever.

The flaps 31*a*, one of each of which is provided for each lever 8, are all pivotably supported on a metal bar 59 which in turn is supported in the side members of the drawer. In the event of the forces acting on the flaps being greater than those which the rod is able to absorb, the strip 21 of the drawer is arranged above the flaps so that it can bear thereon.

A mechanism for manually releasing the flap 31 is shown in FIG. 4. A strip, which is urged forwardly by a spring 41, is supported so as to slide along the longitudinal direction of the drawer in a front frame thereof which is correspondingly extended by the part 38. Tappets 40 extend in the manner of a comb from the strip 39 through the frame part 22 and 21 to the rear as far as the flaps 31. It is evident that the application of thrust on to the strip 39 in the inserting direction causes a vertically positioned flap 31 to be pushed to the rear by the associated tappet 40 and being thus released. The user soon acquires the habit of pushing in the drawer by depressing the strip 39. This results in automatic releasing of the flap 31 which is locked. The flap 31 can also be released by the frame part 38 in association with the tappets instead of by the strip 39.

Friction brakes for the side edges of the register cards are indicated at 42. Each of said friction brakes comprises a base which is adhesively affixed to the casing member and from which loops or rounded hooks project to the card edges and have a principal orientation which extends perpendicularly to the card edges in the region thereof. These loops, the curvature diameter of which is preferably a multiple of the card thickness, apply a uniform frictional force.

I claim:

1. In combination with a telephone number register having a shallow casing,
   - a drawer guidedly operative therein for supporting register cards and adapted for moving out of the front side of said casing, and
   - a plurality of double levers supported on the drawer, each supporting on its rear end a projection selector for raising those registered cards associated therewith when the respective front lever end thereof is lowered, the improvement in each of said levers comprising:
   - locking means for holding said front lever end lowered upon actuation, and
   - releasing means connected to at least one of said drawer and casing for releasing said locking means upon insertion of said drawer.

2. Telephone number register as described in claim 1, and including
   - spring means connected to the underside of said drawer for outwardly biasing said drawer,
   - a cam connected to said drawer,
   - a bar connectable to said casing extending across and underneath the front ends of said plurality of double levers, and
   - a pawl connectable to said bar for engaging said cam when said drawer is in the inserted position,
   - said pawl being released when a front end of one of said levers is lowered.

3. Telephone number register as described in claim 1, wherein said locking means comprises
   - a horizontal spindle connected to said drawer extending transversely to the direction of said lever,
   - a flap pivotal about said spindle above said front lever end, said flap dropping onto the bottom dead-centre position when said front lever end is lowered.

4. Telephone number register as described in claim 3, and including
   - a two-armed lever pivotable about a transversely extending axis supported in said drawer,
   - said bottom end being heavier than said top end,
   - a threshold connectable to the bottom of said casing for contacting the bottom end of said two-armed lever, and
   - a rearwardly directed drawer motion with respect to said casing causing said threshold to contact said lower end of said two-armed lever so as to move the top end thereof to pivot said flap from the bottom dead-center position.

5. Telephone register as described in claim 3, and including a tappet for independently releasing said flap.

6. Telephone number register as described in claim 3, and including a stop abutment connected to said drawer behind said flap slightly rearwardly of its bottom dead-center position.

7. Telephone number register as described in claim 3, wherein said spindle is a thin rod and including a rigid part connected to said drawer above said spindle to support said spindle against locking forces applied upwardly against said flaps.

8. Telephone number register as set forth in claim 3, and including a plurality of stop abutments, one associated with each of said flaps, connectable to said casing for respectively releasing said flaps from the bottom dead-center positions upon insertion of said drawer.

9. Telephone number register as set forth in claim 8, wherein each of said stop abutments is resillient so that it is downwardly deflected by its associated flap when said flap is in its bottom dead-center position when said drawer is moved outwardly.

10. Telephone number register as described in claim 9, wherein said stop abutment comprises a resilient reed fixedly secured to said casing projecting from the bottom rear to the front top.

11. Telephone number register as described in claim 8, wherein said stop abutment is a pivotable lever.

* * * * *